March 9, 1965 M. H. GROVE 3,172,638
GATE VALVE BODY CONSTRUCTION
Filed Aug. 16, 1961 5 Sheets-Sheet 1
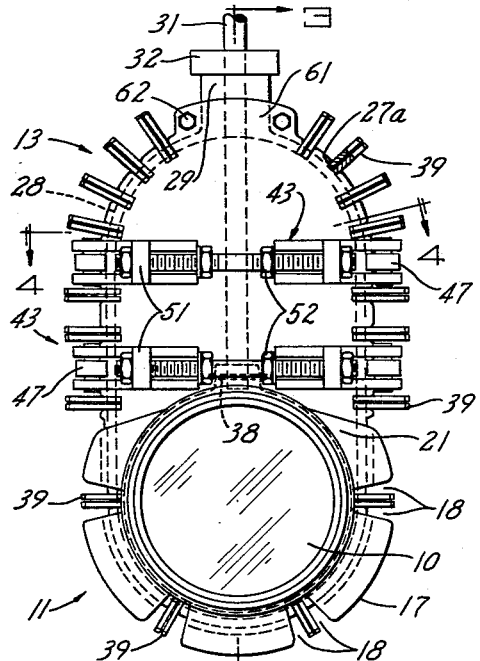
FIG_1_
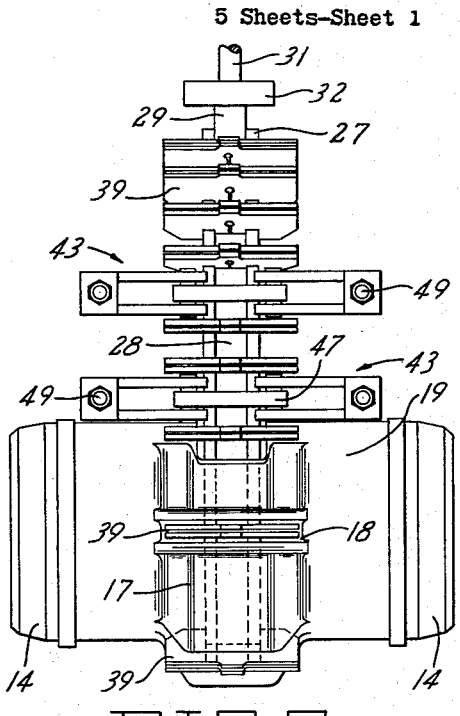
FIG_2_
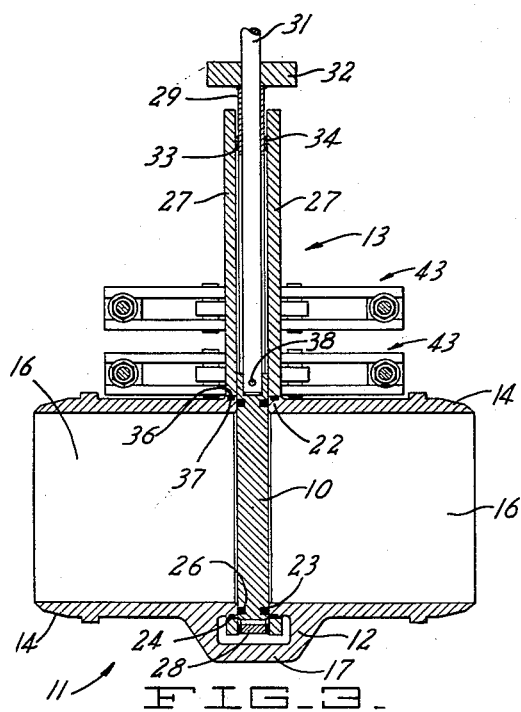
FIG_3_
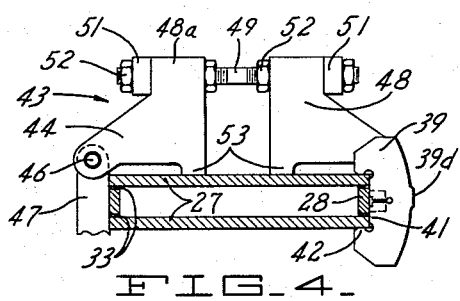
FIG_4_
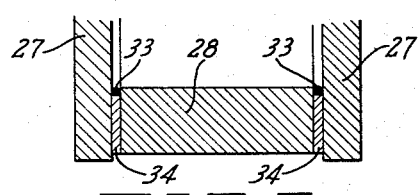
FIG_5_
INVENTOR.
Marvin H. Grove.
BY
Flehr and Swain
ATTORNEYS March 9, 1965   M. H. GROVE   3,172,638
GATE VALVE BODY CONSTRUCTION
Filed Aug. 16, 1961   5 Sheets-Sheet 2
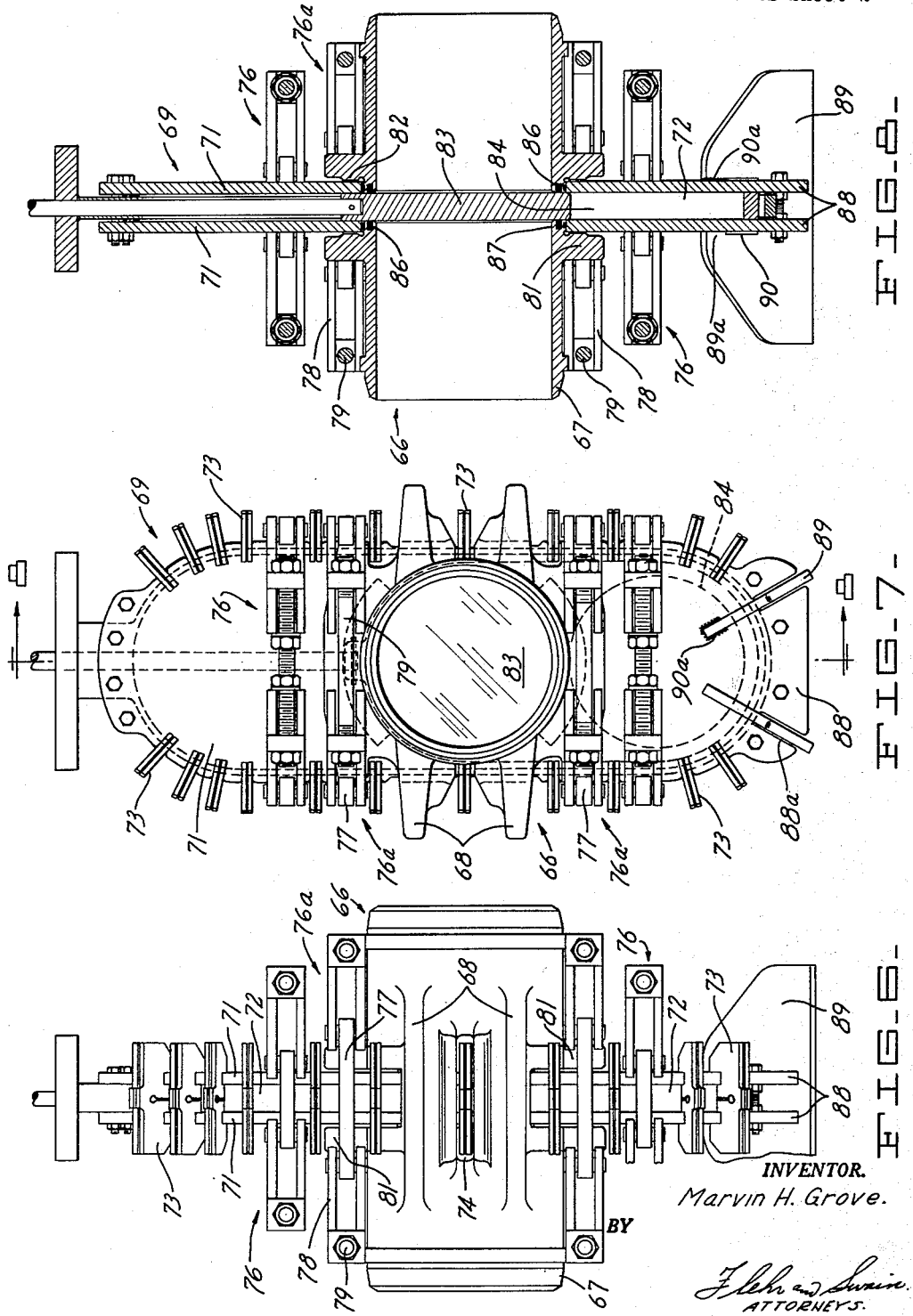
INVENTOR.
Marvin H. Grove.
BY
ATTORNEYS.

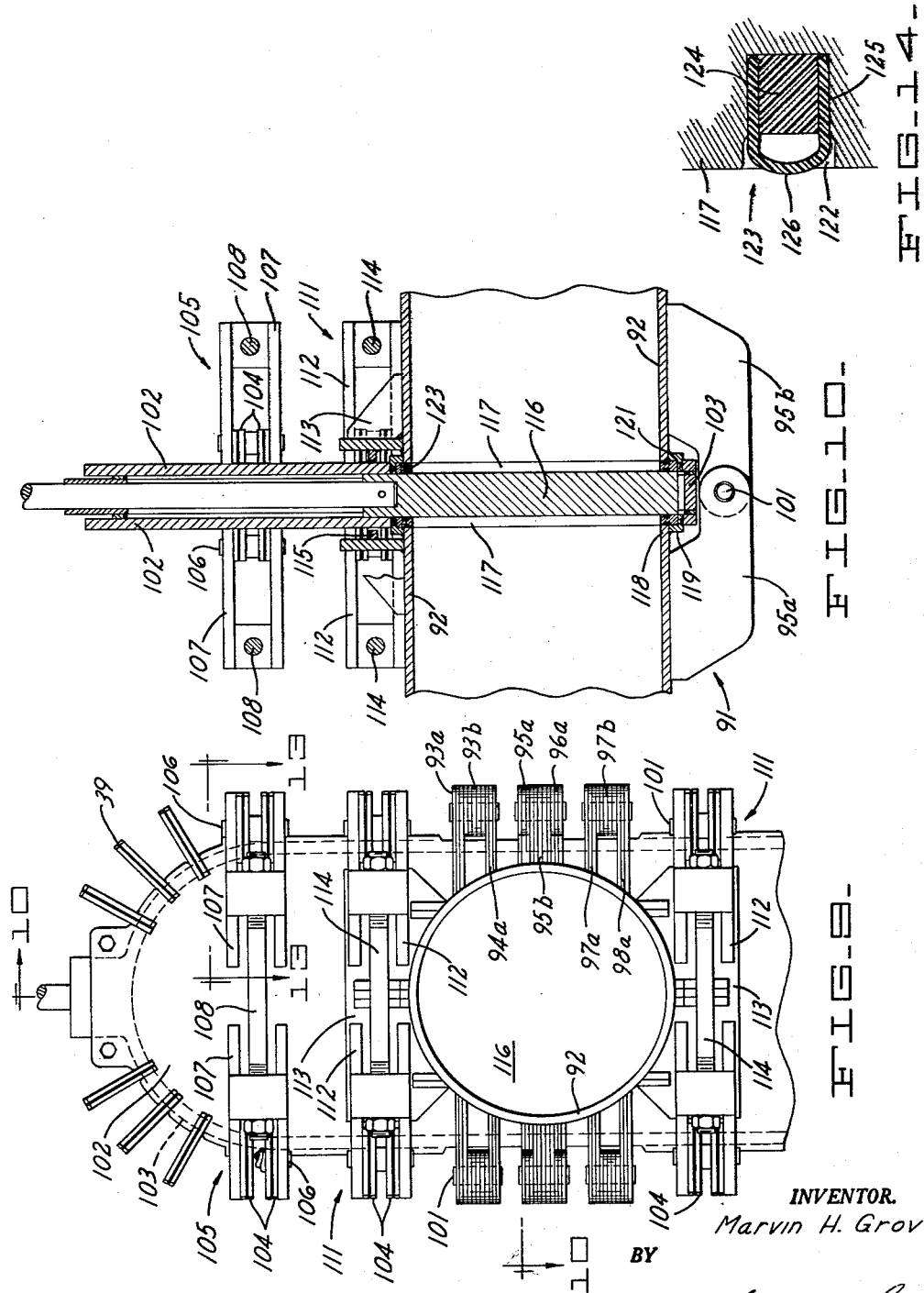

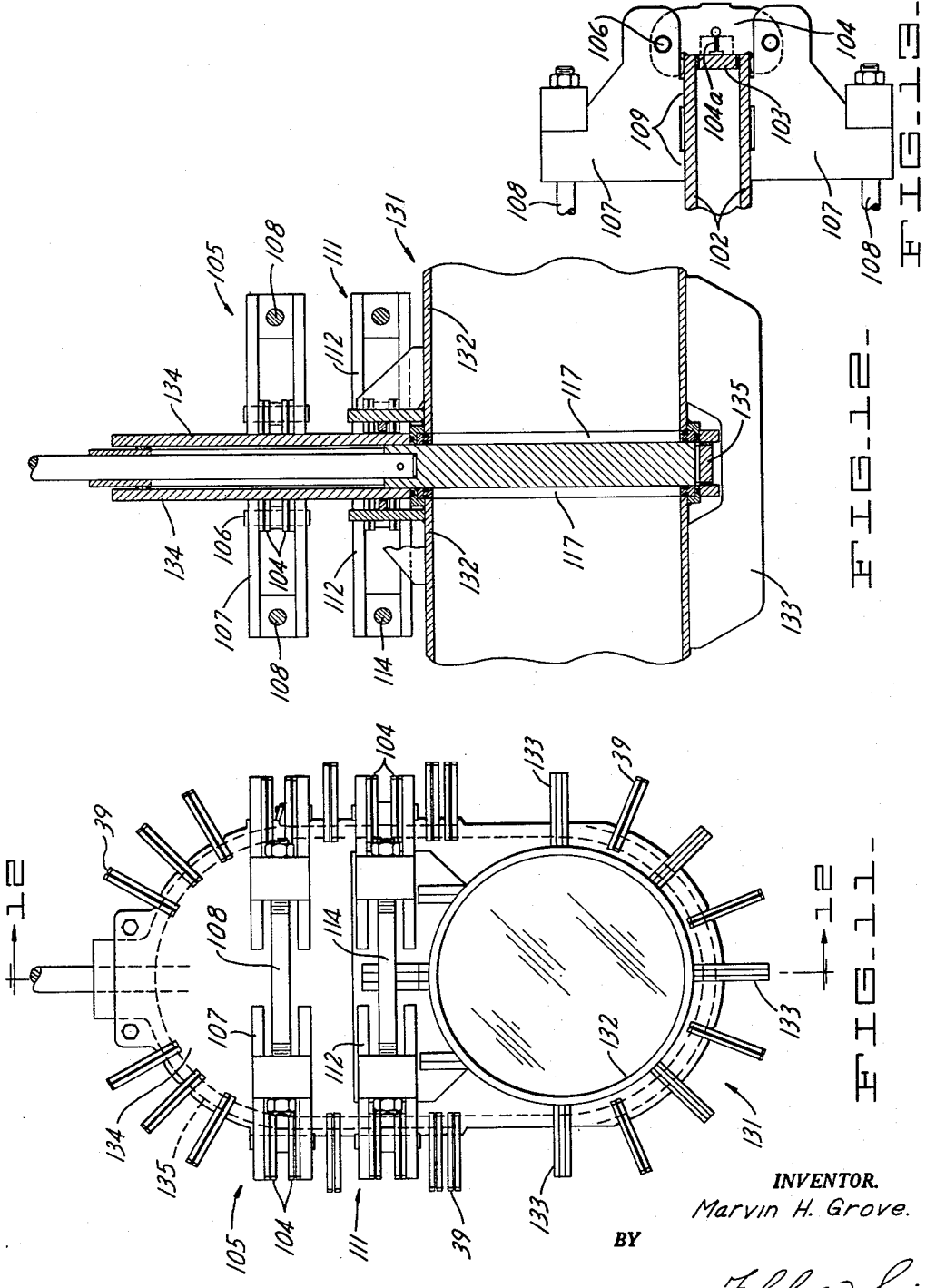

March 9, 1965  M. H. GROVE  3,172,638
GATE VALVE BODY CONSTRUCTION
Filed Aug. 16, 1961  5 Sheets-Sheet 5
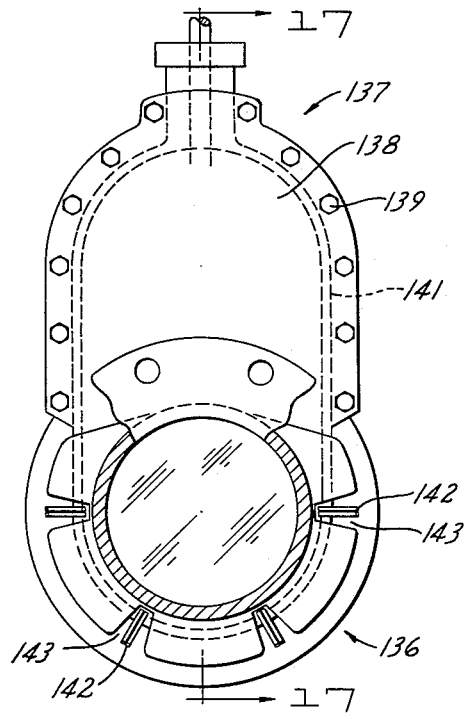
FIG_15_
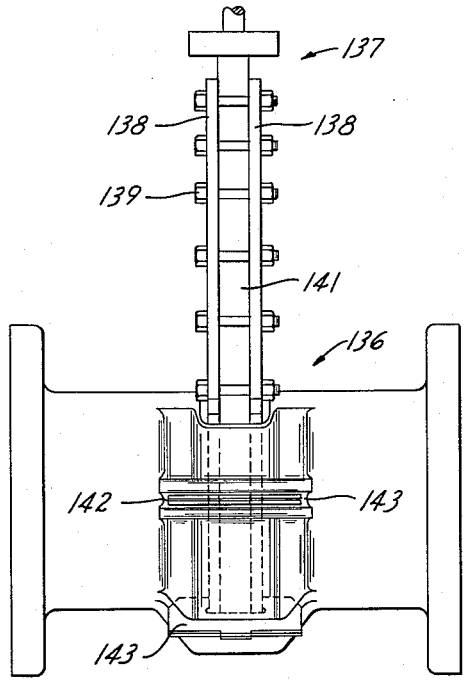
FIG_16_
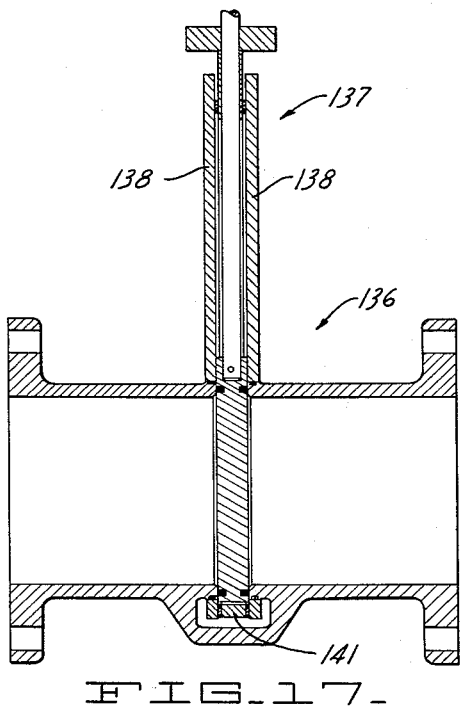
FIG_17_
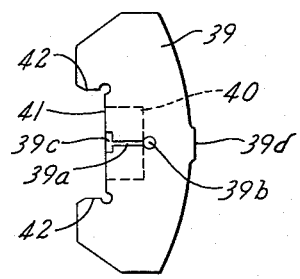
FIG_18_
INVENTOR.
Marvin H. Grove.
BY
Flehr and Swain
ATTORNEYS.

United States Patent Office 3,172,638
Patented Mar. 9, 1965

3,172,638
GATE VALVE BODY CONSTRUCTION
Marvin H. Grove, 340 Hillside Ave., Piedmont, Calif.
Filed Aug. 16, 1961, Ser. No. 131,802
4 Claims. (Cl. 251—329)

This invention relates generally to valves of the gate type for controlling fluid flow.

It has been proposed to construct gate valve bodies by clamping or otherwise securing separate end body plates against an intermediate body part, with the side plates having aligned openings for making connection with associated piping. Such a valve is shown, for example, in U.S. Patent No. 1,780,828 and British 471,417 of 1937. One problem involved in such valves is that when the end body plates are made of mill rolled steel, they are subject to deflection under applied line pressure, and such deflection disturbs the relationship between the side faces of the gate and the associated seating or valve working surfaces on the body. Consequently in the commercial manufacture of valves of this type, it is difficult to design and construct them with close clearances without the probability of improper seating action under various line pressures. Another problem pertains to the means employed for clamping the end plates against the intermediate body part. Bolts are not entirely satisfactory because of extra metal required for accommodating the bolt holes, and because of drilling requirements.

In general it is the object of the present invention to provide a new valve construction of the fabricated body type, having stationary seating surfaces which remain true and accurately located with respect to each other, while at the same time having body parts which are subject to deflection under varying line pressures.

Another object of the invention is to provide a novel valve construction wherein end body plates are clamped upon an intermediate body part in a novel manner, without the use of conventional bolting.

Another object of the invention is to provide novel valve body clamping means which serve to reinforce the end body plates against outward deflection.

Additional objects and features of the invention will appear from the following description in which the preferred embodiment has been set forth in detail in conjunction with the accompanying drawing.

Referring to the drawing:

FIGURE 1 is an end view in elevation, partly in section, illustrating a valve incorporating the present invention;

FIGURE 2 is a side view showing the valve illustrated in FIGURE 1;

FIGURE 3 is a cross sectional view taken along the line 3—3 of FIGURE 1;

FIGURE 4 is a cross sectional view taken along the line 4—4 of FIGURE 1;

FIGURE 5 is a detail in section showing a suitable sealing means between portions of the valve body.

FIGURE 6 is a side view in illustration, illustrating another embodiment of the invention.

FIGURE 7 is an end view of the valve shown in FIGURE 6.

FIGURE 8 is a side elevational view in section, showing the valve of FIGURES 6 and 7, with certain parts removed.

FIGURE 9 is an end view in elevation, showing another embodiment, but with the lower part of the valve body cut away.

FIGURE 10 is a cross sectional view taken along the line 10—10 of FIGURE 9.

FIGURE 11 is a side view in elevation showing another embodiment.

FIGURE 12 is a cross sectional view taken along the line 12—12 of FIGURE 11.

FIGURE 13 is a cross sectional detail taken along the line 13—13 of FIGURE 9.

FIGURE 14 is a detail in section illustrating the valve sealing means incorporated in the embodiments of FIGURES 9–12.

FIGURE 15 is an end elevational view, partly in section, showing another embodiment.

FIGURE 16 is a side view of the valve shown in FIGURE 15.

FIGURE 17 is a section taken along the line 17—17 of FIGURE 15.

FIGURE 18 is a view in side elevation showing one of the spring clamping devices, before its application to the body.

The valve illustrated in the drawing consists of an internal valve gate 10 which is disposed within the valve body 11. Th body consists of two principal units, namely a hub structure 12, and a fabricated body assembly 13 which houses the gate 10 for open position of the valve, and which carries the operating stem and bonnet.

The structure 12 of the body consists of the hubs 14 which are rigidly secured together, and which in this instance are cast as an integral structure. The ends of the hubs are machined and adapted for making connection with associated piping. As is well known to those familiar with valves, the hubs may be constructed for making connections to piping by welding, by flange connections or by threaded connections. The flow passages 16 afforded by the two hubs are in alignment. Assuming that the hub structure is made as a casting of suitable metal (e.g. steel), outwardly offset segments 17 are provided which form integral connections between the inner end portions of the hubs. These segments are separated by the circumferentially spaced slots 18, and extend substantially 180° about the lower end of the valve assembly as viewed in FIGURE 1. The portions of the hubs above the level of the axis of passages 16 are integrally connected together by the portions 19, which are on both sides of the valve. The adjacent ends of the hubs are provided with upwardly extending flanges 21, which are disposed upon opposite sides of the fabricated body assembly 13, as shown in FIGURE 3. The opposed portions 22 of the hubs are annular and are machined to provide the stationary sealing surfaces 23, and the peripheral cylindrical surfaces 24.

The gate 10 (FIGURE 1) is shown in closed position between the sealing surfaces 23. It is provided with suitable resilient seal rings 26, as for example seal rings of the type disclosed in my aforesaid application Serial No. 43,396. The machining of the surfaces 23 is such that the clearances between these surfaces and the adjacent side surfaces of the gate 10, are maintained at a minimum.

The fabricated assembly 13 of the body consists of flat end plates 27 which may be formed of mill rolled structural steel. These plates are clamped upon an intermediate body part 28, which is in the form of an oval band. A bonnet block 29 is provided at one end of the intermediate body part 28, and is bored to receive the operating rod or stem 31. The exterior bonnet plate 32 is shown attached to the exterior end of block 29. The bonnet block and plate 32 serve to retain suitable stem sealing means, as for example seal rings of the resilient O-ring type. Suitable operating means (not shown) is provided for moving the valve stem 31 between open and closed poistions.

Means is provided for forming seals between the intermediate body part 28 and the end plates 27. In this instance seal rings 33 of the resilient O-ring type, are provided. They are retained by suitable means such as by positioning them within the flat metal retainers 34, which are clamped between the ends of the body part 28 and the adjacent inner faces of the plates 27.

The lower portions of the plates 27 are provided with machined openings to provide cylindrical surfaces 36, which fit over the surfaces 24 on the hub portions 22. The fit is such as normally to permit some relative movement between these parts, thereby accommodating for limited deflection of the end plates 27 under varying applied line pressures. Suitable sealing means, such as resilient O-rings 37, prevent leakage between the plates 27 and the hub portions 22.

The inner end of the operating stem 31 is attached to the gate 10 by suitable means, such as the pin 38.

Clamping means serve to clamp the margins of the plates 27 upon the intermediate body part 28. Preferably the clamping means employs a series of substantially C-shaped spring clamps 39, as shown particularly in FIGURE 4, and may be formed of metal plates having spring properties. Pads 41 formed on the intermediate portion of each clamp serves to engage the adjacent portions of the end plates 27 and the intermediate body part 28, and aid in retaining body part 28 in proper position against applied internal pressure. In practice these clamps can be stamped or otherwise cut from spring metal plates (FIGURE 18), with sufficient machining to provide the accuracy required for proper clamping action. Before application of a clamp, its throat portion is provided with a slot 39a having its ends terminating in the cutaway area 39b and recess 39c. This provides adequate spring for application without galling, and to accomodate for variations in the thickness of the valve parts. The parallel clamping faces 42 are finished and spaced apart to provide an initial clamping force when a clamp is forced over the body to the position illustrated, as by impacting the lug 39d with a hammer or like tool. After application, a thin weld shield 40 or backing bar is applied to one side of the clamp, and then slot 39a is filled with weld metal. As the weld metal cools, its shrinkage serves to tighten the clamp and to develop the desired clamping force. While the clamps are shown in pairs, it is generally satisfactory or even preferable to employ single clamps. When used in pairs they may be driven on separately with insertion of a thin metal (e.g. copper) shield, after which the slots 39a are successively closed by welding to develop the desired clamping forces.

To facilitate proper location of the clamps, the end plates 27 may be provided with notches 27a that are engaged by the pads 41.

In addition to the clamping devices 39, the clamping devices 43 are provided which not only provide forces to clamp the end plates 27 together, but in addition apply forces serving to reinforce the side plates against outward deflection. As shown particularly in FIGURE 4, these clamping devices consist of arms 44 which have pivotal connections 46 to the links 47. Portions 48 of these arms form shoulders which seat blocks 48a. The clamping bolts or tensioning rods 49 extend through blocks 48a and are threaded to receive the clamping nuts 51, and the lock nuts 52. Pads 53 on the arms 44 engage the corresponding side plates 27 in spaced areas located at predetermined spaced points between the side edges.

With the clamping assembly 43 applied to the fabricated body assembly, and with the clamping bolts 49 under tension, pads 53 apply external pressure to the end plates 27, thus tending to clamp these parts together upon the intermediate body part 28, and at the same time reinforcing the end plates 27 against outward deflection.

In addition to the C clamps 39 which engage the upper portion of the fabricated body assembly 13, it will be noted that such clamps 39 engage those margins of the end plates 27 which surround the annular hub portions 22, and these clamps are located within the circumferentially spaced slots 18.

At the upper or bonnet end of the body, the end plates 27 are shown provided with extensions 61 to accommodate the clamping bolts 62. In the manufacture and assembly of the valve described above, the hub structure 11 is cast in one integral piece, and independently machined. The end plates 27 are inserted between the annular portions 22 of the hubs, and fitted over the cylindrical machined portions 24. The gate together with the body part 28 is now inserted between the plates 27, and after the parts are properly positioned, the bolts 62 and the various clamping devices 39 are applied and tightened by the welding procedure previously described. Finally the clamping devices 43 are applied. Because hubs 14 are rigid and rigidly connected together, the sealing surfaces 23 are not subject to warping and remain accurately positioned with respect to each other and with respect to the side faces of the gate, for varying line pressures. Therefore it is possible to construct this valve with relatively close clearances between the sealing surfaces and the gate. Internal pressures within the fabricated body assembly 13 may cause more or less deflection of the end plates 27. This is accommodated by relative movement between these plates and the annular portions 22, without in any way displacing or affecting the sealing surfaces. Thus the fabricated assembly can be economically designed to resist line pressures with a substantial amount of body deflection.

The valve described above is of the plain gate type. In FIGURES 6–8 I have shown an embodiment which is of the through port type. In other words, a gate is provided with a circular port which registers with the flow passages for open position of the valve. The hub construction 66 in this instance is made of an integral casting, with the hub portions 67 being rigidly and integrally connected by the side ribs 68.

The body assembly 69 consists of the flat end plates 71 together with the intermediate body part 72. These parts are firmly clamped together by means of the C clamps 73, the latter being driven on and welded during assembly. It will be noted that certain of these C clamps are located within the slots 74, between the ribs 68. An articulated clamping assembly 76, like that shown in FIGURE 4, is shown applied across both extensions of the body, to resist outward deflection. The parts of this clamping device have been given the same numbers as in FIGURE 4. Somewhat similar clamping devices 76a are shown adjacent the upper and lower sides of the hub structure. The devices 76a consist of side links 77, having their ends pivotally connected to the arms 78. The arms are connected by the tension rods or bolts 79, which function in the same manner as the bolts 49 of FIGURE 4. Pads upon the arms 78 engage the flanges or ribs 81, which extend from the upper and lower sides of the hub structure. Thus the clamping devices 76 apply clamping forces between the hub portions 67, thereby reinforcing the hub structure against internal pressure and stresses that may be applied by the associated clamping. The flanges 81 are shown provided with limiting pads 82 that are disposed a short distance from the adjacent faces of the end plates 71. These pads 82 normally do not interfere with outward deflection of the plates 71, unless such deflection exceeds a predetermined amount, in which event engagement with pads 82 tends to limit further deflection.

The valve gate 83 in this instance is in the form of a flat plate, provided with the port opening 84. For full open position of the valve port opening 84 is brought into registry with the flow passages provided by the hub portions 67. The sealing means illustrated in this instance is in the form of seal rings 86 formed of suitable resilient material, which are accommodated in grooves provided in the machined annular portions 87 of the hub structure.

The lower end of the valve body is shown provided with side plate extensions 88, which are slotted at 88a to receive the foot plates 89. Plates 89 are C-shaped and have portions 89a that engage the end plates 71. Each plate 89 is shown attached to an end plate 71 by welding 90a.

In the embodiment of FIGURES 9 and 10, the valve likewise is of the through port type, but the hub structure is completely fabricated instead of being formed of a casting. The articulated clamping devices are also incorporated with body clamping devices of the C type that are similar to clamps 39. Thus the hub structure 91 in this instance consists of the hub portions 92, which are formed of steel tubing or mill rolled steel, and which are provided with welded on reinforcing and connecting ribs.

Referring particularly to FIGURE 9, it will be seen that on each side of one hub there are several welded on ribs designated 93a, 94a, 95a, 96a, 97a and 98a. The associated hub is provided with welded on ribs 93b, 95b and 97b. Preferably these ribs are of laminated construction. In other words, each rib is built up by successive application of plates that are separately welded in place. The positioning is such that the flanges or ribs interleave in the manner shown in FIGURE 10. Assuming that the two hub portions are properly located with respect to each other, with the welded on ribs interleaved as shown in FIGURE 10, the interleaved portions are drilled or reamed (if previously drilled or punched) to receive the tightly fitted pins 101. Thus the hub structure can be assembled with good accuracy after all of the welding operations have been completed.

The body assembly in this instance consists of plates 102, which are clamped against the intermediate body part 103 by the C clamps 39. The C clamps 104 on the sides of the body are formed to provide links for the articulated clamping devices 105. Thus, as shown particularly in FIGURE 13, the C clamps 104 are applied over the side margins of the body plates 102. The throat slots of these clamps, corresponding to slots 39a, are similarly closed by welding 104a to cause the clamps to develop the desired clamping forces. The ends of clamps 104 are pivotally connected by pins 106 to the clamping arms 107. The tension rods 108 serve to connect the extremities of the arms 107, and the arms are provided with pads 109 for engaging the adjacent body plate 102, thereby resisting outward deflection. With this type of articulated clamping device, the C clamps 104 serve to apply clamping forces upon the margins of the plates 102, while the tension rods 108 aid in holding the C clamps in place against the intermediate body part 103, and in addition cause application of forces to the areas of the end plates 102 engaged by the pads 109 to resist outward body deflection.

The articulated clamping devices 111 are formed in substantially the same manner as the devices 105. However, in this instance, the arms 112 of these devices engage flanges 113 which are welded upon the hub portions 92. Thus when the rods 114 of these clamping devices are tightened, forces are applied to clamp the two hub portions of the hub structure together, in regions at the upper and lower sides of the hub structure. It will be noted that flanges 113 have welded on lugs 115, which serve as limiting pads to limit outward deflection of the body plates 102. The clamping devices 111, like the devices 105, incorporate the spring C clamps 104, and these clamps engage the side margins of the body plates 102.

While various sealing means can be provided for the valve of FIGURES 9 and 10, the sealing means illustrated (FIG. 14) is of novel construction and differs from the previously described embodiments. Thus the side surfaces of the gate 116 are arranged to engage the seat rings 117, which are formed of suitable metal. The annular portions 118 of the hub structure are enlarged by the welded on annuluses 119, and are machined to provide the seat ring accommodating recesses 121. The annular seat rings fit within the recesses 121, the tolerances being such that when fully assembled, the gate is freely movable and the seat rings may somewhat follow the gate. When the gate is pressed toward one side or the other, by fluid pressure, its thrust is taken by the seat ring upon the down flow side. The opposite side faces of each seat ring are provided with annular grooves or recesses 122, which are fitted with the resilient sealing means 123. While the resilient sealing means may vary, in this instance it consists of a ring which is U-shaped in section and which is formed of a suitable elastic material like nylon. A filler ring 124, which likewise may be formed of nylon, is disposed between the portions 125, and the entire sealing assembly is compressed and force fitted in the groove 122, to prevent its dislodgement during operating conditions. The exposed curved portion 126 of this sealing means is capable of flexing and forming a fluid tight seal. When assembled as shown in FIGURE 10, it will be evident that for each seat ring one resilient seal 123 makes sealing engagement with the associated valve working surface of the gate 116, and the other seal makes fluid tight engagement with the bottom machined surface of the recess 121.

While the sealing means shown in FIGURES 9 and 10 are not carried by the gate, they can be inserted or removed after the gate has been removed from the assembly. Also when the valve is assembled, they may if it is desirable, be inserted into the hub structure before the body plates and associated parts are applied.

The embodiment of FIGURES 11 and 12 is somewhat similar to FIGURES 10 and 11. The hub structure 131 is fully fabricated, and is formed by ribs 133, which extend directly between the hub portions, and which are welded upon the hub portions. The end plates 134 of the body assembly are clamped upon the intermediate body part 135, by the spring C clamps 39. Also clamping devices 105 and 111 are provided and are applied in the manner described with reference to FIGURES 9 and 10. The seat rings 117 employed in this instance are the same as in FIGURES 9 and 10.

FIGURES 15–17 illustrate a simplified modification that is suitable for the lower operating pressures. In this instance the hub structure 136 is an integral casting (e.g., cast iron), and the body assembly 137 consists of plate-like end body parts 138 clamped by bolts 139 upon the intermediate body part 141. The manner in which the body assembly 137 is associated with the hub structure can be substantially the same as in FIGURES 1 and 2. The C clamps 142 are shown positioned within the slots 143 and engage the body assembly, as in FIGURES 1 and 2.

Instead of using the welding operation described above, for application of the C clamps, they may be made without the slot 39a, and properly sized with respect to the spacing between faces 42. At the time of application, the clamps are heated and then applied while expanded. Upon cooling the clamp shrinks and applies the desired clamping forces.

The subject matter disclosed but not claimed herein is claimed in my copending application Ser. No. 202,747, filed June 15, 1962, for "Valve Construction."

I claim:

1. A hub structure comprising a pair of aligned hubs and means forming rigid connecting members between said hubs, the adjacent annular portions of the hubs having opposed parallel machined surfaces and cylindrical peripheral surfaces, and a body assembly comprising separable plate-like end members and an intermediate body part disposed between said members, each of said end plate-like members having a cylindrically shaped opening slidably fitted upon the cylindrical surface of one of said annular portions of the hub structure, said end plate-like members and said intermediate body part being dimensioned for application through the space between said hub portions, means forming seals between said annular portions and said end plate-like members, and a valve gate having substantially flat parallel side surfaces disposed between said annular hub portions movable between open and closed positions.

2. A valve construction as in claim 1 together with additional means serving to clamp the hub portions together in that region of said structure which spans the assembly.

3. A valve construction as in claim 2 together with seat rings carried by said annular portions of the hubs.

4. In a valve construction, a body formed in two parts, the first part being a hub structure comprising hub portions and means for fixedly connecting the hub portions together, the second part comprising an assembly that is rectangular in cross-section and including spaced end plate-like members, said plate-like members having openings slidably fitted upon adjacent aligned annular portions of the hub structure, means forming seals between the plate-like members and said annular portions of the hubs, and means separate from the second part for fixedly connecting the hub portions, said last means comprising offset ribs secured to the hub portions and attached together by pins.

References Cited by the Examiner

UNITED STATES PATENTS

| | | | |
|---|---|---|---|
| 2,208,180 | 7/40 | Delleani | 251—366 X |
| 2,737,365 | 3/56 | Taylor | 251—329 |
| 2,775,805 | 1/57 | Sands | 24—243 |
| 2,779,366 | 1/57 | McKenzie | 24—243 |
| 2,904,306 | 9/59 | Bryant | 251—367 |
| 2,952,437 | 9/60 | Knox | 251—195 XR |
| 2,982,514 | 5/61 | Bryant | 251—329 |

FOREIGN PATENTS

| | | |
|---|---|---|
| 1,054,800 | 4/59 | Germany. |
| 471,417 | 6/37 | Great Britain. |

M. CARY NELSON, *Primary Examiner.*

MARTIN P. SCHWADRON, WILLIAM F. O'DEA, M. KAUFMAN, *Examiners.*